US012003052B2

(12) United States Patent
Reedy

(10) Patent No.: US 12,003,052 B2
(45) Date of Patent: Jun. 4, 2024

(54) FEMALE ELECTRICAL BUS BAR CONNECTOR AND METHOD OF FORMING SAME

(71) Applicant: Aptiv Technologies AG, Schaffhausen (CH)

(72) Inventor: Patrick Reedy, Youngstown, OH (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 337 days.

(21) Appl. No.: 17/568,109

(22) Filed: Jan. 4, 2022

(65) Prior Publication Data

US 2022/0285872 A1 Sep. 8, 2022

Related U.S. Application Data

(60) Provisional application No. 63/155,384, filed on Mar. 2, 2021.

(51) Int. Cl.
*H01R 13/24* (2006.01)
*H01R 13/18* (2006.01)
*H01R 13/502* (2006.01)
*H01R 25/16* (2006.01)

(52) U.S. Cl.
CPC ......... *H01R 13/2407* (2013.01); *H01R 13/18* (2013.01); *H01R 13/502* (2013.01); *H01R 25/16* (2013.01)

(58) Field of Classification Search
CPC .. H01R 13/2407; H01R 13/18; H01R 13/502; H01R 25/16
See application file for complete search history.

(56) References Cited

U.S. PATENT DOCUMENTS

| | | | | |
|---|---|---|---|---|
| 3,201,556 A | 8/1965 | Baird | | |
| 7,104,812 B1 * | 9/2006 | Bogiel | H01R 12/724 | 439/79 |
| 7,581,972 B2 * | 9/2009 | Daamen | H01R 13/6315 | 439/249 |
| 7,892,050 B2 * | 2/2011 | Pavlovic | H01R 13/112 | 439/857 |

(Continued)

OTHER PUBLICATIONS

Extended European Search Report for EP Application No. 22155622.8, dated Jul. 11, 2022, 8 pages.

*Primary Examiner* — Phuong Chi Thi Nguyen
(74) *Attorney, Agent, or Firm* — Billion & Armitage

(57) ABSTRACT

An electrical connector includes a pair of electrical contacts between which two electrical bus bars are received. Each electrical contact in the pair of electrical contacts having a central base, a first plurality of contact fingers extending longitudinally from the base, and a second plurality of contact fingers extending from the base in the opposite direction. The electrical connector also includes a spring assembly having a retaining band configured to secure the pair of electrical contacts within the electrical connector. The spring assembly further has a first plurality of spring fingers extending longitudinally from the retaining band in the first direction, and a second plurality of spring fingers extending longitudinally from the retaining band in the second direction. A spring finger of the first or second plurality of spring fingers is in compressive contact with at least one contact finger of the first and second plurality of elongate contact fingers.

20 Claims, 6 Drawing Sheets

(56) References Cited

U.S. PATENT DOCUMENTS

| | | | | |
|---|---|---|---|---|
| 9,705,300 | B1 * | 7/2017 | Maurer .................. | H02G 5/007 |
| 9,800,004 | B1 * | 10/2017 | Schepis .................. | H01R 4/305 |
| 2020/0153141 | A1 | 5/2020 | Zhang et al. | |

* cited by examiner

FEMALE ELECTRICAL BUS BAR CONNECTOR AND METHOD OF FORMING SAME

CROSS-REFERENCE TO RELATED APPLICATION

This application claims benefit of priority to U.S. Application No. 63/155,384 filed on Mar. 2, 2021, the entire disclosure of which is hereby incorporated by reference.

SUMMARY

This patent application is directed to an electrical bus bar connector, particularly a bus bar connector having a female socket configured to receive a bus bar at each end of the connector.

According to one or more aspects of the present disclosure, an electrical connector configured to interconnect two electrical bus bars includes a pair of electrical contacts between which the two electrical bus bars are received. Each electrical contact in the pair of electrical contacts having a central base, a first plurality of elongate contact fingers extending longitudinally from the base in a first direction, and a second plurality of elongate contact fingers extending longitudinally from the base in a second direction opposite to the first direction. The electrical connector also includes a spring assembly having a retaining band surrounding the bases of the pair of electrical contacts. The supporting assembly is configured to secure the pair of electrical contacts within the electrical connector. The spring assembly further has a first plurality of elongate spring fingers extending longitudinally from the retaining band in the first direction, and a second plurality of elongate spring fingers extending longitudinally from the retaining band in the second direction, wherein a spring finger of the first or second plurality of spring fingers is in compressive contact with at least one contact finger of the first and second plurality of elongate contact fingers.

In one or more embodiments of the electrical connector according to the previous paragraph, the electrical bus bar assembly, each spring finger of the first and second plurality of spring fingers is in compressive contact with at least one contact finger of the first and second plurality of elongate contact fingers.

In one or more embodiments of the electrical connector according to any one of the previous paragraphs, a portion of the at least one contact finger is canted toward a centerline of the electrical connector and a tip of the at least one contact finger is canted away from the centerline of the electrical connector.

In one or more embodiments of the electrical connector according to any one of the previous paragraphs, a first material electrically conductive forming the pair of electrical contacts has a higher value of electrical conductivity than a second material electrically conductive forming the spring assembly.

In one or more embodiments of the electrical connector according to any one of the previous paragraphs, the first material is a copper-based alloy.

In one or more embodiments of the electrical connector according to any one of the previous paragraphs, the second material is a stainless-steel alloy.

In one or more embodiments of the electrical connector according to any one of the previous paragraphs, the pair of electrical contacts is a first a pair of electrical contacts. The electrical connector further includes a second pair of electrical contacts. Each electrical contact in the second pair of electrical contacts has a central base, a first plurality of elongate contact fingers extending longitudinally from the base in the first direction, and a second plurality of elongate contact fingers extending longitudinally from the base in the second direction. Outwardly oriented surfaces of the second pair of contacts are in intimate contact with inwardly oriented surfaces of the first pair of contacts.

In one or more embodiments of the electrical connector according to any one of the previous paragraphs, each electrical contact in the first a pair of electrical contacts is identical and wherein each electrical contact in the second pair of contact is identical.

In one or more embodiments of the electrical connector according to any one of the previous paragraphs, the retaining band defines dovetail features to secure ends of the retaining band to one another.

In one or more embodiments of the electrical connector according to any one of the previous paragraphs, the central bases define tabs extending laterally from the central bases and the retaining band defines apertures in which the tabs are received, thereby securing the pair of electrical contacts within the electrical connector.

According to one or more aspects of the present disclosure, a method of forming an electrical connector configured to interconnect two electrical bus bars includes the step of forming a pair of electrical contacts from a sheet of a first electrically conductive material. Each electrical contact in the pair of electrical contacts having a central base, a first plurality of elongate contact fingers extending longitudinally from the base in a first direction, and a second plurality of elongate contact fingers extending longitudinally from the base in a second direction opposite to the first direction. The method also includes the steps of bending a portion of at least one contact finger of the first and second plurality of elongate contact fingers so that it is canted toward a centerline of the electrical connector and bending a tip of the at least one contact finger so that it is canted away from the centerline of the electrical connector and forming a spring assembly from a sheet of a second electrically conductive material. The spring assembly has a retaining band, a first plurality of elongate spring fingers extending longitudinally from the retaining band in the first direction, and a second plurality of elongate spring fingers extending longitudinally from the retaining band in the second direction. The method further includes the step of wrapping the retaining band around the bases of the pair of electrical contacts, thereby securing the pair of electrical contacts within the electrical connector and bending a spring finger of the first or second plurality of spring fingers inwardly such that the spring finger is in compressive contact with at least one contact finger of the first and second plurality of elongate contact fingers.

In one or more embodiments of the method according to the previous paragraph, the method further comprises the step of bending each spring finger of the first and second plurality of spring fingers inwardly such that each spring finger is in compressive contact with at least one contact finger of the first and second plurality of elongate contact fingers.

In one or more embodiments of the method according to any one of the previous paragraphs, the first electrically conductive material has a higher value of electrical conductivity than a second material electrically conductive forming the spring assembly.

In one or more embodiments of the method according to any one of the previous paragraphs, the first material is a copper-based alloy.

In one or more embodiments of the method according to any one of the previous paragraphs, the second material is a stainless-steel alloy.

In one or more embodiments of the method according to any one of the previous paragraphs, the pair of electrical contacts is a first a pair of electrical contacts, The method further includes the step of forming a second pair of electrical contacts from a sheet of the first electrically conductive material. Each electrical contact in the second pair of electrical contacts has a central base, a first plurality of elongate contact fingers extending longitudinally from the base in the first direction, and a second plurality of elongate contact fingers extending longitudinally from the base in the second direction. The method additionally includes the step of arranging the first and second pairs of electrical contacts such that inwardly oriented surfaces of the second pair of contacts are in intimate contact with outwardly oriented surfaces of the first pair of contacts.

In one or more embodiments of the method according to any one of the previous paragraphs, each electrical contact in the first a pair of electrical contacts is identical and wherein each electrical contact in the second pair of contact is identical.

In one or more embodiments of the method according to any one of the previous paragraphs, the retaining band defines dovetail features to secure ends of the retaining band to one another.

In one or more embodiments of the method according to any one of the previous paragraphs, the central bases define tabs extending laterally from the central bases and the retaining band defines apertures in which the tabs are received, thereby securing the pair of electrical contacts within the electrical connector.

According to one or more aspects of the present disclosure, an electrical connector configured to interconnect two electrical bus bars includes a pair of electrical contacts between which the two electrical bus bars are received. Each electrical contact in the pair of electrical contacts having a central base, a first plurality of elongate contact fingers extending longitudinally from the base in a first direction, and a second plurality of elongate contact fingers extending longitudinally from the base in a second direction opposite to the first direction. The electrical connector also includes a means for applying a compressive force to the pair of electrical contacts. The means is configured to conduct less than 10% of the current flowing through the electrical connector.

DESCRIPTION OF THE DRAWINGS

The present invention will now be described, by way of example with reference to the accompanying drawings, in which.

DETAILED DESCRIPTION

Figure 1:
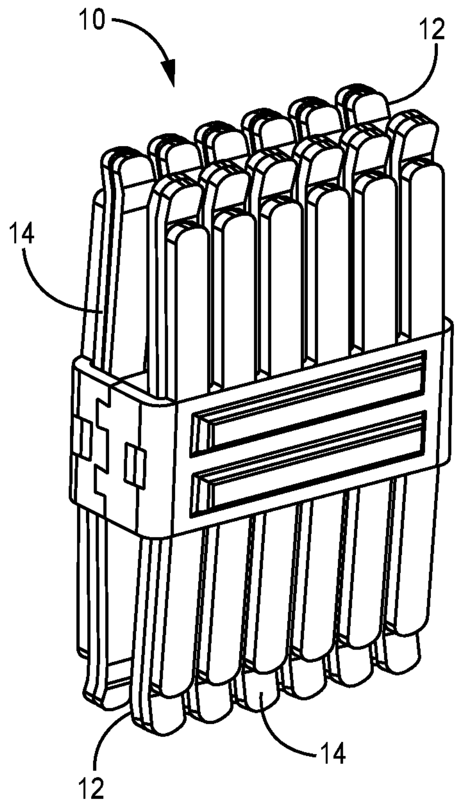
FIG. 1 is a perspective view of a first female-to-female electrical bus bar connector according to according to some embodiments.
Figure 2A:
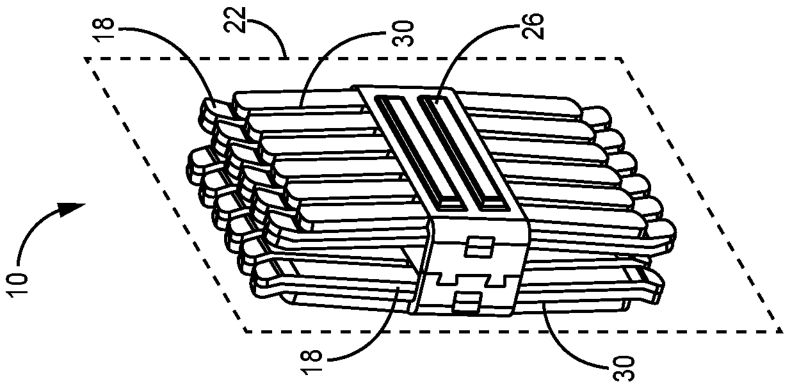
FIG. 2A is a perspective view of a second female-to-female electrical bus bar connector according to some embodiments.
Figure 2B:
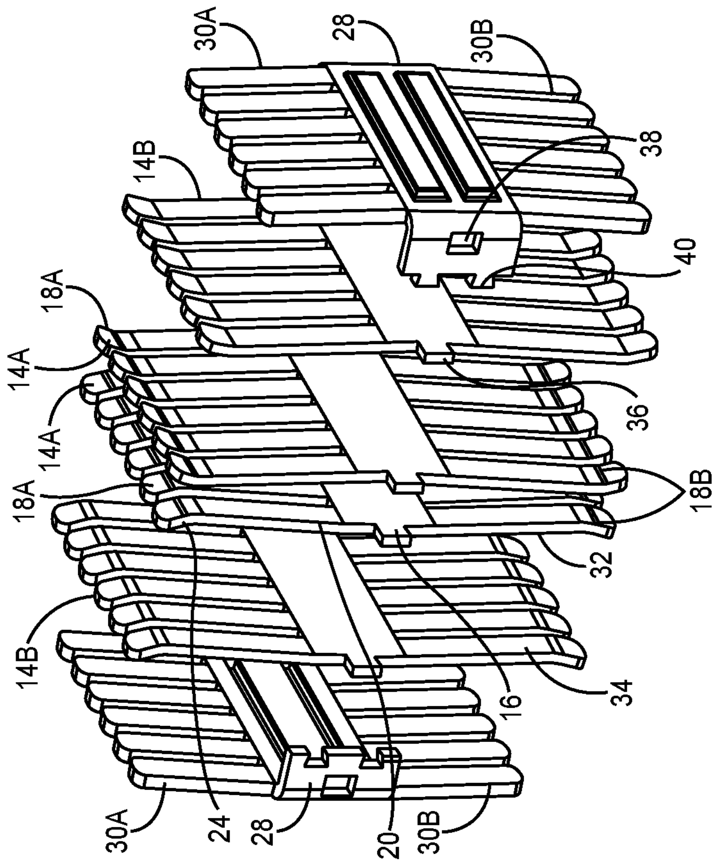
FIG. 2B is an exploded view of the second female-to-female electrical bus bar connector of FIG. 2A according to some embodiments.
Figure 3A:
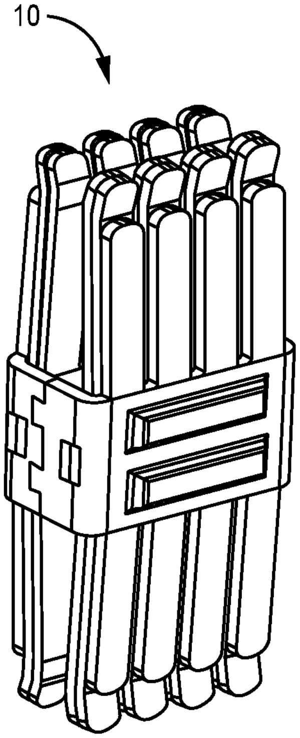
FIG. 3A is a perspective view a third female-to-female electrical bus bar connector according to some embodiments.
Figure 3B:
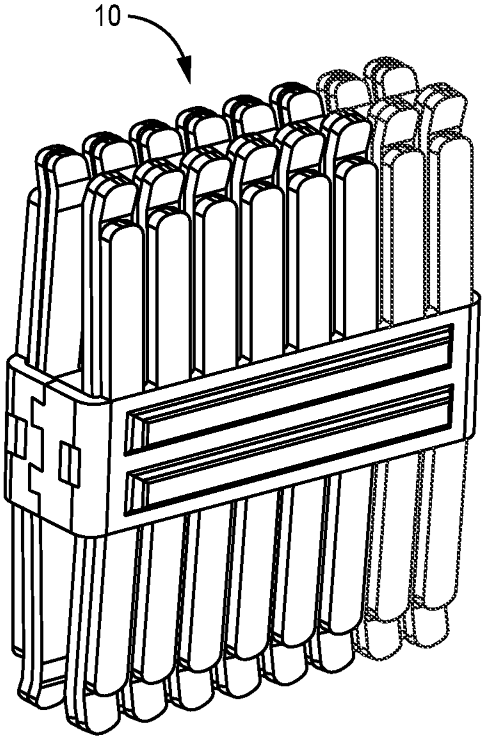
FIG. 3B is a perspective view of a fourth female-to-female electrical bus bar connector according to some embodiments.
Figure 4A:
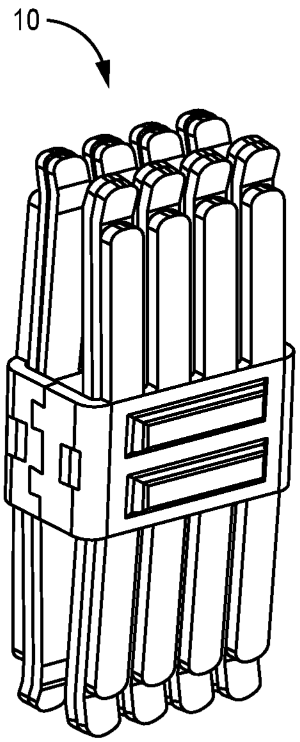
FIG. 4A is a perspective view a fifth female-to-female electrical bus bar connector according to some embodiments.
Figure 4B:
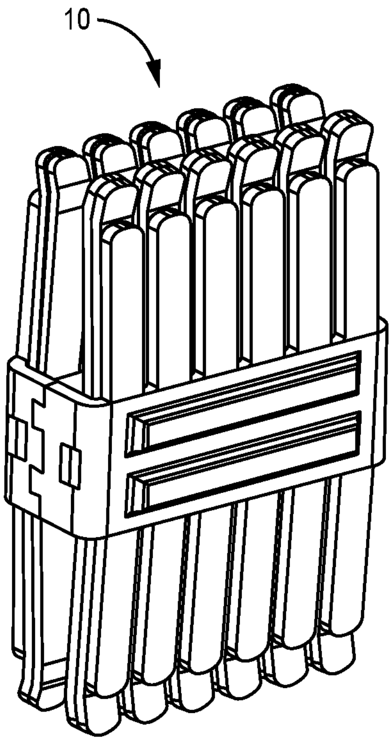
FIG. 4B is a perspective view of a sixth female-to-female electrical bus bar connector according to some embodiments.

FIGS. 1-4B illustrate examples of an electrical connector 10 well suited for high voltage, e.g., over 200 volts. The electrical connector 10 has a female socket 12 at each end that is configured to receive a solid electrical conductor, e.g., a rectangular electrical bus bar (not shown) in each end of the connector. The connector has at least one pair of electrical contacts 14 at each end that are configured to receive the bus bars. As best shown in the exploded view of FIG. 2B, each of the electrical contacts 14 has a mesial or central base portion 16. A first plurality of elongate contact fingers 18A extends longitudinally from the base in a first direction and a second plurality of elongate contact fingers 18B extends longitudinally from the base portion 16 in a second direction opposite to the first direction. A mesial portion 20 of the contact fingers located closest to the base is canted or bent inwardly, i.e., toward a longitudinal central plane 22 through the electrical connector 10 (see FIG. 2A) so that the contact fingers 18 are in compressive contact with the bus bars when they are inserted within the electrical connector 10. A distal portion or tip 24 at the free ends of the contact fingers 18 is canted outwardly away from the longitudinal central plane 22 to allow the bus bars to more easily be inserted between the contact fingers 18.

The electrical connector also has a spring assembly 26 with a retaining band 28 that surrounds the bases 16 of the electrical contacts 14. The retaining band 28 secures the pair of electrical contacts 14 within the electrical connector 10. The spring assembly 26 further has a first plurality of elongate spring fingers 30A that extend longitudinally from the retaining band 28 in the first direction and a second plurality of elongate spring fingers 30B that extend longitudinally from the retaining band 28 in the second direction. When the spring assembly 26 is assembled to the electrical connector 10, the spring fingers 30 are in compressive contact with the contact fingers 18 and push the contact fingers inwardly toward the longitudinal central plane 22 and the bus bar inserted between the contact fingers 18. The spring fingers 30 are configured so that they provide at least 90% of the contact force applied by the electrical connector 10 to the bus bars while the contact fingers 18 provide 10% or less of the of the contact force applied by the electrical connector 10 to the bus bars. The spring fingers 30 are bent inwardly at a greater angle than the contact fingers 18, thereby applying a pre-load force to the contact fingers 18.

As shown in FIGS. 1-4B, there are two or more pairs of the electrical contacts 14. The inner contacts 14A are not identical to the outer contacts 14B and have a slightly different profile so that the outer contacts 14B will nest against the inner contacts 14A. The inner and outer contacts 14A, 14B on one side of the electrical connector 10 are identical to the corresponding inner and outer contacts 14A, 14B on the opposite side. This nesting of the inner and outer contacts 14A, 14B allows an outer side 32 of the inner contacts 14A to be in intimate contact with an inner side 34 of the outer contacts 14B. This nesting provides an effectively thicker electrical contact within the electrical connector 10 that allows a higher value of current to be safely conducted through the electrical connector 10. Further, the nested inner and outer contacts 14A, 14B are also more flexible than contact fingers that have the same effective thickness and that are formed from a single layer of the same material. This flexibility allows the spring assembly 26 to apply 90% or more of the contact force which would not be possible with a single layer of the same material. The use of nested inner and outer contacts 14A, 14B also allows the electrical contacts 14 to be formed from a thinner material that is less expensive, more readily available, and easier to form than a thicker material. The embodiments of the electrical connector 10 shown in FIGS. 3A and 3B have two pairs of the electrical contacts while the embodiments of the electrical connector 10 shown in FIGS. 4A and 4B have three pairs of the electrical contacts. The number of contact fingers 18 in the embodiments of the electrical connector 10 may also vary as can be seen in FIGS. 3A-4B.

The electrical contacts 14 are made of a material that has a higher electrical conductivity value than the material forming the spring assembly 26. For example, the electrical contacts 14 may be formed of C110 copper alloy which offers high electrical and thermal conductivity. The spring assembly 26 may be made of SAE 301½ hard stainless-steel alloy. Due to the higher conductivity of the electrical contacts 14, most of the current passing through the electrical connector 10 will pass through the electrical contacts 14 rather than the spring assembly 26. Therefore, the properties of the spring assembly 26 can be optimized for application of the contact force to the bus bars without consideration of current carrying capabilities. Since the electrical contacts 14 provide less than 10% of the spring force, most of the initial spring force will still be provided by the spring fingers 30 even if the contact fingers 18 relax due to heating because the spring fingers 30 are not as susceptible to relaxation due to heating as the copper contact fingers.

In some embodiments, the spring assembly 26 is integrally formed from a single piece of sheet metal and in other embodiments, the spring assembly 26 is made of two halves that are identical to each other.

The base portions 16 of the contacts define tabs 36 that extend laterally from the base. The retaining band defines apertures in which these tabs are received within corresponding apertures 38 extending through the retaining band 28, thereby securing the electrical contacts within the electrical connector. The retaining band 28 may have attachment features 40, such as a dovetail features, which are arranged so that they match up when one end of the retaining band 28 is bent to join the other end of the retaining band 28.

Figure 6:
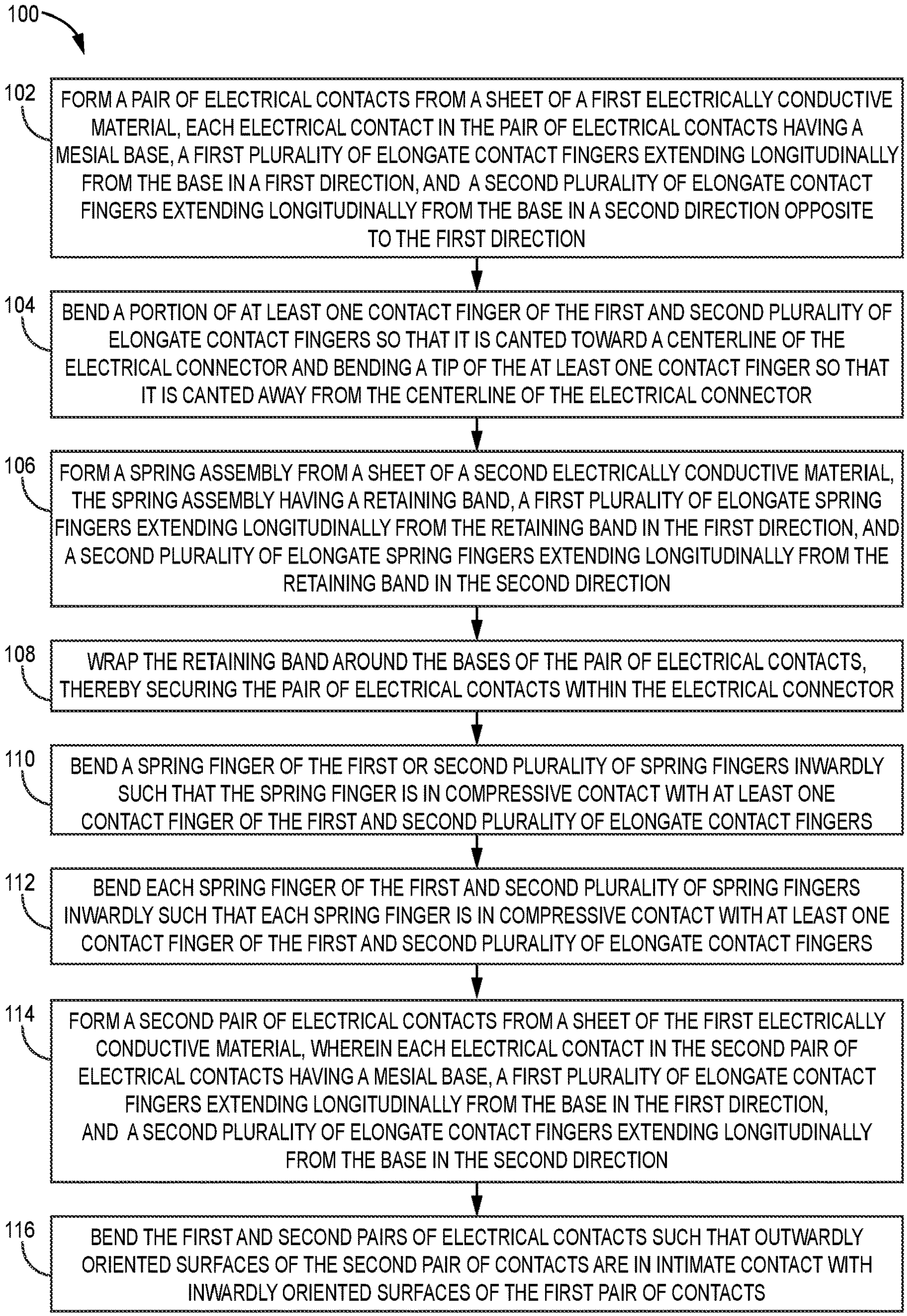
FIG. 6 is a flow chart of a method of manufacturing a female-to-female electrical bus bar connector according to some embodiments.

A method 100 of manufacturing an electrical connector 10 is shown in the flow chart of FIG. 6. The various steps of the method 100 are described below:

STEP 102, FORM A PAIR OF ELECTRICAL CONTACTS FROM A SHEET OF A FIRST ELECTRICALLY CONDUCTIVE MATERIAL, EACH ELECTRICAL CONTACT IN THE PAIR OF ELECTRICAL CONTACTS HAVING A CENTRAL BASE, A FIRST PLURALITY OF ELONGATE CONTACT FINGERS EXTENDING LONGITUDINALLY FROM THE BASE IN A FIRST DIRECTION, AND A SECOND PLURALITY OF ELONGATE CONTACT FINGERS EXTENDING LONGITUDINALLY FROM THE BASE IN A SECOND DIRECTION OPPOSITE TO THE FIRST DIRECTION, includes forming a pair of electrical contacts 14 from a sheet of a first electrically conductive material, each electrical contact 14A, 14B in the pair of electrical contacts 14 having a central base portion 16, a first plurality of elongate contact fingers 18A extending longitudinally from the base portion 16 in a first direction, and a second plurality of elongate contact fingers 18B extending longitudinally from the base portion 16 in a second direction opposite to the first direction;

STEP 104, BEND A PORTION OF AT LEAST ONE CONTACT FINGER OF THE FIRST AND SECOND PLURALITY OF ELONGATE CONTACT FINGERS SO THAT IT IS CANTED TOWARD A CENTERLINE OF THE ELECTRICAL CONNECTOR AND BENDING A TIP OF THE AT LEAST ONE CONTACT FINGER SO THAT IT IS CANTED AWAY FROM THE CENTERLINE OF THE ELECTRICAL CONNECTOR, includes bending a portion of at least one contact finger 18 of the first and second plurality of elongate contact fingers 18A, 18B so that it is canted toward a centerline or the longitudinal central plane 22 of the electrical connector 10 and bending a tip 24 of the at least one contact finger 18 so that it is canted away from the centerline or the longitudinal central plane 22 of the electrical connector 10;

STEP 106, FORM A SPRING ASSEMBLY FROM A SHEET OF A SECOND ELECTRICALLY CONDUCTIVE MATERIAL, THE SPRING ASSEMBLY HAVING A RETAINING BAND, A FIRST PLURALITY OF ELONGATE SPRING FINGERS EXTENDING LONGITUDINALLY FROM THE RETAINING BAND IN THE FIRST DIRECTION, AND A SECOND PLURALITY OF ELONGATE SPRING FINGERS EXTENDING LONGITUDINALLY FROM THE RETAINING BAND IN THE SECOND DIRECTION, includes forming a spring assembly 26 from a sheet of a second electrically conductive material, the spring assembly 26 having a retaining band 28, a first plurality of spring fingers 30A, extending longitudinally from the retaining band 28 in the first direction, and a second plurality of spring fingers 30B extending longitudinally from the retaining band 28 in the second direction;

STEP 108, WRAP THE RETAINING BAND AROUND THE BASES OF THE PAIR OF ELECTRICAL CONTACTS, THEREBY SECURING THE PAIR OF ELECTRICAL CONTACTS WITHIN THE ELECTRICAL CONNECTOR, includes wrapping the retaining band 28 around the bases 16 of the pair of electrical contacts 14, thereby securing the pair of electrical contacts 14 within the electrical connector 10;

STEP 110, BEND A SPRING FINGER OF THE FIRST OR SECOND PLURALITY OF SPRING FINGERS INWARDLY SUCH THAT THE SPRING FINGER IS IN COMPRESSIVE CONTACT WITH AT LEAST ONE CONTACT FINGER OF THE FIRST AND SECOND PLURALITY OF ELONGATE CONTACT FINGERS, includes bending a spring finger 30 of the first or second plurality of spring fingers 30A, 30B inwardly such that the spring finger 30 is in compressive contact with at least one contact finger 18 of the first and second plurality of elongate contact fingers 18A, 18B;

STEP 112, BEND EACH SPRING FINGER OF THE FIRST AND SECOND PLURALITY OF SPRING FINGERS INWARDLY SUCH THAT EACH SPRING FINGER IS IN COMPRESSIVE CONTACT WITH AT LEAST ONE CONTACT FINGER OF THE FIRST AND SECOND PLURALITY OF ELONGATE CONTACT FINGERS, is an optional step that includes bending each spring finger 30 of the first and second plurality of spring fingers 30A, 30B inwardly such that each spring finger 30 is in compressive contact with at least one contact finger 18 of the first and second plurality of elongate contact fingers 18A, 18B;

STEP 114, FORM A SECOND PAIR OF ELECTRICAL CONTACTS FROM A SHEET OF THE FIRST ELECTRICALLY CONDUCTIVE MATERIAL, WHEREIN EACH ELECTRICAL CONTACT IN THE SECOND PAIR OF ELECTRICAL CONTACTS HAVING A CENTRAL BASE, A FIRST PLURALITY OF ELONGATE CONTACT FINGERS EXTENDING LONGITUDINALLY FROM THE BASE IN THE FIRST DIRECTION, AND A SECOND PLURALITY OF ELONGATE CONTACT FINGERS EXTENDING LONGITUDINALLY FROM THE BASE IN THE SECOND DIRECTION, is an optional step that includes forming a second pair of electrical contacts 14B from a sheet of the first electrically conductive material, wherein each electrical contact 14 in the second pair of electrical contacts 14B having a central base portion 16, a first plurality of elongate contact fingers 18A extending longitudinally from the base portion 16 in the first direction, and a second plurality of elongate contact fingers 18B extending longitudinally from the base portion 16 in the second direction; and STEP 116, BEND THE FIRST AND SECOND PAIRS OF ELECTRICAL CONTACTS SUCH THAT OUTWARDLY ORIENTED SURFACES OF THE SECOND PAIR OF CONTACTS ARE IN INTIMATE CONTACT WITH INWARDLY ORIENTED SURFACES OF THE FIRST PAIR OF CONTACTS, is an optional step that includes bending the first and second pairs of electrical contacts 14A, 14B such that outwardly oriented surfaces or outer sides 32 of the first pair of contacts 14A are in intimate contact with inwardly oriented surfaces or inner sides 34 of the second pair of contacts 14B.

Figure 5A:
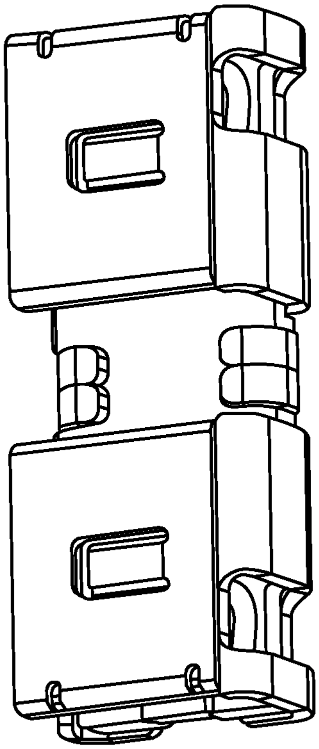
FIG. 5A PRIOR ART
FIG. 5A is a perspective view of a female-to-female electrical bus bar connector according to the prior art.
Figure 5B:
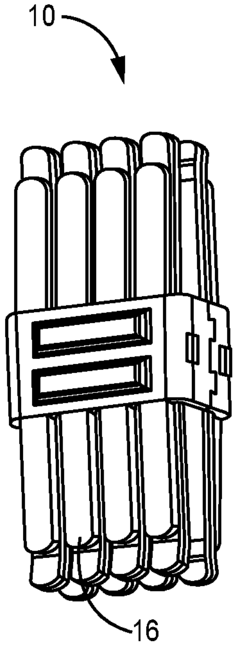
FIG. 5B is another perspective view of the third female-to-female electrical bus bar connector of FIG. 3A according to according to some embodiments.

Accordingly, an electrical connector 10 suited for high voltage/current applications and a method 100 for manufacturing such an electrical connector is provided. The electrical connector 10 and the method 100 provide the benefit of an electrical connector that provides a consistent contact force in elevated temperature conditions and over the operating life of the electrical connector. As can be seen in FIGS. 5A and 5B, the electrical connector 10 is smaller than prior art connector used in similar bus bar connecting applications when shown in the same scale, thereby providing the benefit of requiring less packaging space for the electrical connector 10.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

The invention claimed is:

1. An electrical connector configured to interconnect two electrical bus bars, comprising:

a pair of electrical contacts configured to receive one of the two electrical bus bars, each electrical contact in the pair of electrical contacts having a central base, a first plurality of elongate contact fingers extending longitudinally from the base in a first direction, and a second plurality of elongate contact fingers extending longitudinally from the base in a second direction opposite to the first direction; and a spring assembly having a retaining band surrounding the bases of the pair of electrical contacts and configured to secure the pair of electrical contacts within the electrical connector, the spring assembly further having a first plurality of elongate spring fingers extending longitudinally from the retaining band in the first direction, and a second plurality of elongate spring fingers extending longitudinally from the retaining band in the second direction, wherein a spring finger of the first or second plurality of spring fingers is in compressive contact with at least one contact finger of the first and second plurality of elongate contact fingers.

2. The electrical connector according to claim 1, wherein the retaining band defines dovetail features to secure ends of the retaining band to one another.

3. The electrical connector according to claim 1, wherein the central bases define tabs extending laterally from the central bases and the retaining band defines apertures in which the tabs are received, thereby securing the pair of electrical contacts within the electrical connector.

4. The electrical connector according to claim 1, wherein each spring finger of the first and second plurality of spring fingers is in compressive contact with at least one contact finger of the first and second plurality of elongate contact fingers.

5. The electrical connector according to claim 4, wherein a portion of the at least one contact finger is canted toward a centerline of the electrical connector and a tip of the at least one contact finger is canted away from the centerline of the electrical connector.

6. The electrical connector according to claim 1, wherein the pair of electrical contacts is a first a pair of electrical contacts, wherein the electrical connector further comprises a second pair of electrical contacts, wherein each electrical contact in the second pair of electrical contacts has a central base, a first plurality of elongate contact fingers extending longitudinally from the base in the first direction, and a second plurality of elongate contact fingers extending longitudinally from the base in the second direction, and wherein outwardly-oriented surfaces of the second pair of contacts are in intimate contact with inwardly-oriented surfaces of the first pair of contacts.

7. The electrical connector according to claim 6, wherein each electrical contact in the first a pair of electrical contacts is identical and wherein each electrical contact in the second pair of contact is identical.

8. The electrical connector according to claim 1, wherein a first material electrically conductive forming the pair of electrical contacts has a higher value of electrical conductivity than a second material electrically conductive forming the spring assembly.

9. The electrical connector according to claim 8, wherein the first material is a copper-based alloy.

10. The electrical connector according to claim 8, wherein the second material is a stainless-steel alloy.

11. A method of forming an electrical connector configured to interconnect two electrical bus bars, comprising:

forming a pair of electrical contacts from a sheet of a first electrically conductive material, each electrical contact in the pair of electrical contacts having a central base, a first plurality of elongate contact fingers extending longitudinally from the base in a first direction, and a second plurality of elongate contact fingers extending longitudinally from the base in a second direction opposite to the first direction;

bending a portion of at least one contact finger of the first and second plurality of elongate contact fingers so that it is canted toward a centerline of the electrical connector and bending a tip of the at least one contact finger so that it is canted away from the centerline of the electrical connector;

forming a spring assembly from a sheet of a second electrically conductive material, the spring assembly having a retaining band, a first plurality of elongate spring fingers extending longitudinally from the retaining band in the first direction, and a second plurality of elongate spring fingers extending longitudinally from the retaining band in the second direction;

wrapping the retaining band around the bases of the pair of electrical contacts, thereby securing the pair of electrical contacts within the electrical connector; and bending a spring finger of the first or second plurality of spring fingers inwardly such that the spring finger is in compressive contact with at least one contact finger of the first and second plurality of elongate contact fingers.

12. The method according to claim 11, further comprising bending each spring finger of the first and second plurality of spring fingers inwardly such that each spring finger is in compressive contact with at least one contact finger of the first and second plurality of elongate contact fingers.

13. The method according to claim 11, wherein the first electrically conductive material has a higher value of electrical conductivity than a second material electrically conductive forming the spring assembly.

14. The method according to claim 11, wherein the first material is a copper-based alloy.

15. The method according to claim 11, wherein the second material is a stainless-steel alloy.

16. The method according to claim 11, wherein the retaining band defines dovetail features to secure ends of the retaining band to one another.

17. The method according to claim 11, wherein the central bases define tabs extending laterally from the central bases and the retaining band defines apertures in which the tabs are received, thereby securing the pair of electrical contacts within the electrical connector.

18. The method according to claim 11, wherein the pair of electrical contacts is a first a pair of electrical contacts, wherein the method further comprises:

forming a second pair of electrical contacts from a sheet of the first electrically conductive material, wherein each electrical contact in the second pair of electrical contacts having a central base, a first plurality of elongate contact fingers extending longitudinally from the base in the first direction, and a second plurality of elongate contact fingers extending longitudinally from the base in the second direction; and arranging the first and second pairs of electrical contacts such that inwardly oriented surfaces of the second pair of contacts are in intimate contact with outwardly oriented surfaces of the first pair of contacts.

19. The method according to claim 18, wherein each electrical contact in the first a pair of electrical contacts is identical and wherein each electrical contact in the second pair of contact is identical.

20. An electrical connector configured to interconnect two electrical bus bars, comprising:

a pair of electrical contacts between which the two electrical bus bars are received, each electrical contact in the pair of electrical contacts having a central base, a first plurality of elongate contact fingers extending longitudinally from the base in a first direction, and a second plurality of elongate contact fingers extending longitudinally from the base in a second direction opposite to the first direction; and a means for applying a compressive force to the pair of electrical contacts, which conducts less than 10% of a current flowing through the electrical connector.

* * * * *